United States Patent [19]

Tanaka et al.

[11] Patent Number: 5,031,175
[45] Date of Patent: Jul. 9, 1991

[54] COMMUNICATION CONTROL METHOD FOR RELEASING COMMUNICATION APPARATUS FROM OCCUPIED STATE

[75] Inventors: Shotaro Tanaka; Masao Ikezaki, both of Neyagawa; Hiroshi Sasanuma, Yawata; Yukiko Hase, Machida, all of Japan

[73] Assignees: Matsushita Electric Industrial Co., Ltd., Osaka, Japan; N. V. Philips' Gloeilampenfabricken, Bindhoven, Netherlands

[21] Appl. No.: 407,731

[22] Filed: Sep. 15, 1989

[51] Int. Cl.[5] .............................. H04J 3/24; H04J 3/02
[52] U.S. Cl. .................................. 370/94.1; 370/85.1; 370/110.1
[58] Field of Search .................... 370/94.1, 85.1, 85.2, 370/85.3, 85.4, 110.1, 92, 93; 340/825.5, 825.51

[56] References Cited

U.S. PATENT DOCUMENTS

| | | | |
|---|---|---|---|
| 4,584,679 | 4/1986 | Livingston et al. | 370/94.1 |
| 4,689,785 | 8/1987 | Toyonaga et al. | 370/94.1 |
| 4,727,592 | 2/1988 | Okada et al. | 370/85.2 |
| 4,740,956 | 4/1988 | Hailpern et al. | 370/85.2 |
| 4,779,092 | 10/1988 | Takao | 370/85.2 |
| 4,858,222 | 8/1989 | Weimert et al. | 340/825.5 |

OTHER PUBLICATIONS

Nederlandse Norm, Nederlands Electrotechnisch Comite (NEC), Ontwerp NEN-EN 50 049, May, 1985.

Primary Examiner—Douglas W. Olms
Assistant Examiner—H. Kizou
Attorney, Agent, or Firm—Stevens, Davis, Miller & Mosher

[57] ABSTRACT

A communication control method for use in a communication system including a plurality of communication control apparatuses interconnected through an information transmission path, each of the communication control apparatuses including a packet transmission/reception unit, a timer unit and a controller unit. When a first communication control apparatus has become unable to perform communication due to accidental power-off or a power supply failure or the like in the course of communication with a second communication control apparatus (which has been brought into a locked state by the first communication control apparatus), the invention prevents the second communication control apparatus from being left permanently in the locked state. In that case, the second communication control apparatus transmits a lock confirmation packet to the first communication control apparatus to make lock confirmation as to whether the locked state is to be maintained, when the second communication control apparatus does not receive any communication packet from the first communication control apparatus for a predetermined period of time. When no reply to the lock confirmation is received or alternatively when an unlock authorization packet is received by the second communication control apparatus, the second communication control apparatus releases itself from the locked state.

3 Claims, 7 Drawing Sheets

COMMUNICATION CONTROL METHOD FOR RELEASING COMMUNICATION APPARATUS FROM OCCUPIED STATE

BACKGROUND OF THE INVENTION

The present invention generally relates to a communication control method for a communication system in which a plurality of communication control apparatuses are interconnected mutually by way of a communication line. More particularly, this invention is concerned with a communication control method for protecting a communication control apparatus from being undesirably left in an occupied or locked state incapable of any further communication when a failure occurs in a counterpart communication control apparatus with which communication has been performed in the locked state.

Figure 2:
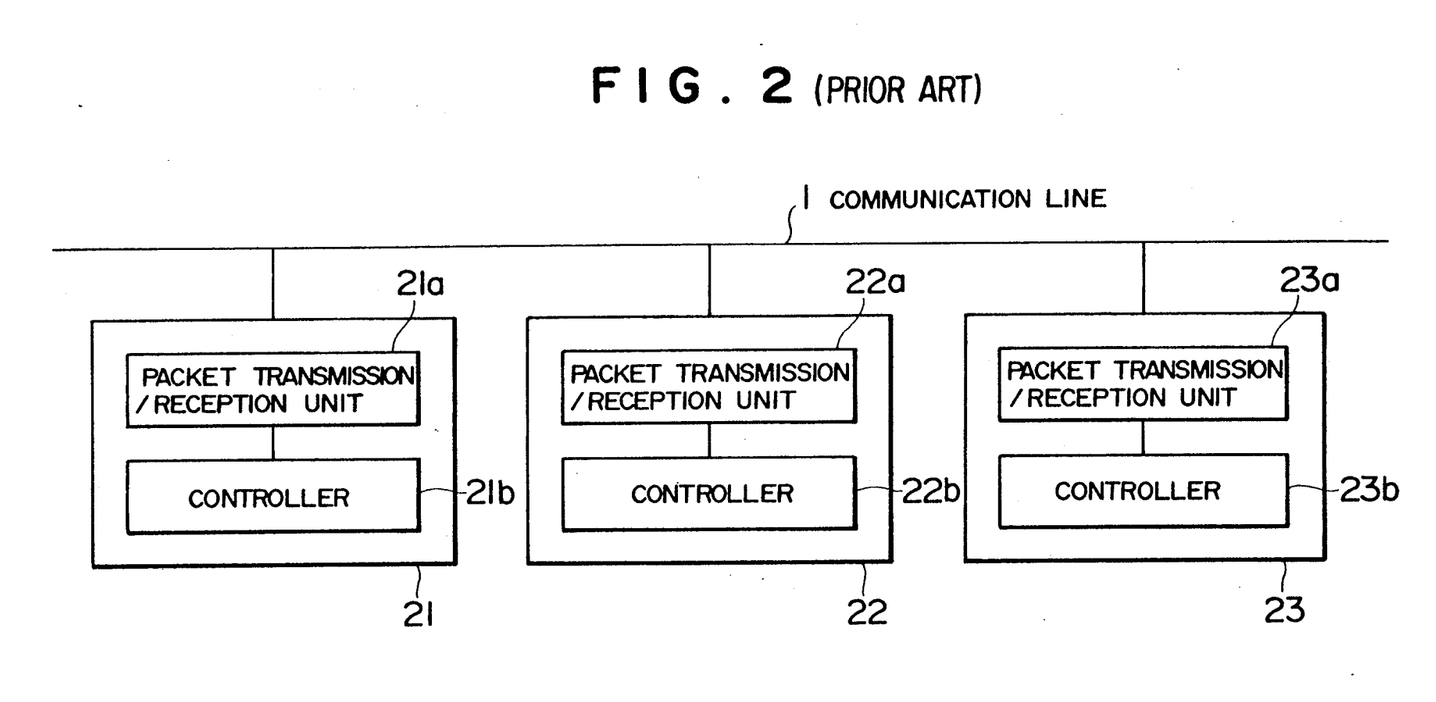
FIG. 2 is a block diagram showing schematically a general arrangement of a conventional communication system.
Figure 5:
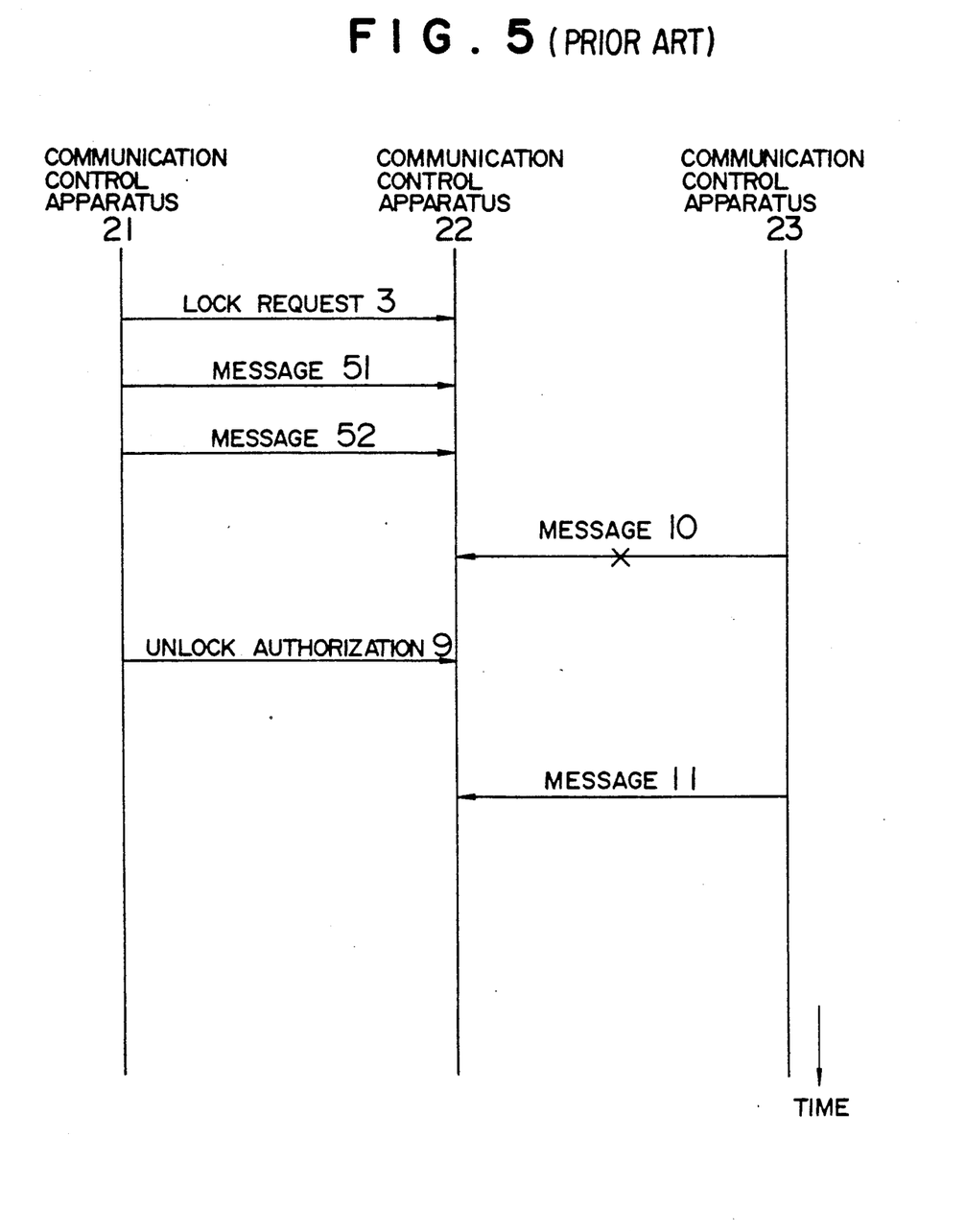
FIGS. 5 and 6 are diagrams illustrating communication sequences in the conventional communication system.

For affording a better understanding of the present invention, problems in a communication system (an improvement of which this invention concerns) will be described in some detail. FIG. 2 of the accompanying drawings shows in a block diagram a conventional communication system in which a plurality of communication control apparatuses are mutually interconnected by way of a communication line 1. The communication control apparatus 21 is composed of a packet transmission/reception unit 21a and a controller 21b. Similarly, the communication control apparatus 22 includes a packet transmission/reception unit 22a and a controller 22b, and the communication control apparatus 23 is constituted by a packet transmission/reception unit 23a and a controller 23b. When the communication control apparatus 21 performs communication with the communication control apparatus 22, the controller 21b of the communication control apparatus 21 first supplies communication data to be transmitted to the packet transmission/reception unit 21a. Upon reception of the communication data, the packet transmission/reception unit 21a sends out the data in the form of packets for transmission onto the communication line 1. The packet transmission/reception unit 22a of the communication control apparatus 22 then receives the packets from the communication line 1 and transfers the corresponding communication data to the controller 22b which receives the data as the communication data from the communication control apparatus 21. In the communication system shown in FIG. 2 in which communication is carried out in the manner mentioned above, each of the communication control apparatuses performs occupation control or lock control of the counterpart or addressee communication control apparatus in precedence to data communication. More specifically, an addresser communication control apparatus transmits a lock (occupation) request packet to an addressee communication control apparatus to which the addresser apparatus desires to transmit data, in precedence to the transmission of the data. Upon reception of the lock request packet by the addressee communication control apparatus, the latter is set to a locked state in which the addressee communication control apparatus can no more receive communication packets from any other communication control apparatus than the addresser apparatus which had caused the locked state. Upon completion of the required data transmission, the addresser communication control apparatus finally sends an unlock request to the addressee communication control apparatus to thereby release the latter from the occupied or locked state. By way of example, an explanation will be made of a case where the communication control apparatus 21 communicates with the communication control apparatus 22, by making reference to FIG. 5. In that case, the addresser communication control apparatus 21 sends a lock request packet 3 to the addressee communication control apparatus 22 in precedence to data transmission, as is illustrated in FIG. 5. Upon reception of the lock request packet 3, the communication control apparatus 22 is locked to a state incapable of receiving any communication packet sent from other communication control apparatuses than the addresser communication control apparatus 21. In this state, the addresser communication control apparatus 21 sends data to be transmitted to the addressee communication control apparatus 22 in the form of communication messages 51 and 52. In the course of this communication, even if a communication message 11 is sent to the communication control apparatus 22 from the communication control apparatus 23, the former is not in the state capable of receiving the communication message 11 because the communication control apparatus 22 is locked or occupied by the communication control apparatus 21. Only after the communication control apparatus 21 sends an unlock (lock release) request 9 to the communication control apparatus 22 and the communication control apparatus 22 recognizes by this unlock request that it has been released from the locked state is the communication control apparatus 22 brought into the position to receive the communication message 11 from the communication control apparatus 23. The data transmission among the communication control apparatuses is realized through the lock control procedure as described above.

Figure 6:
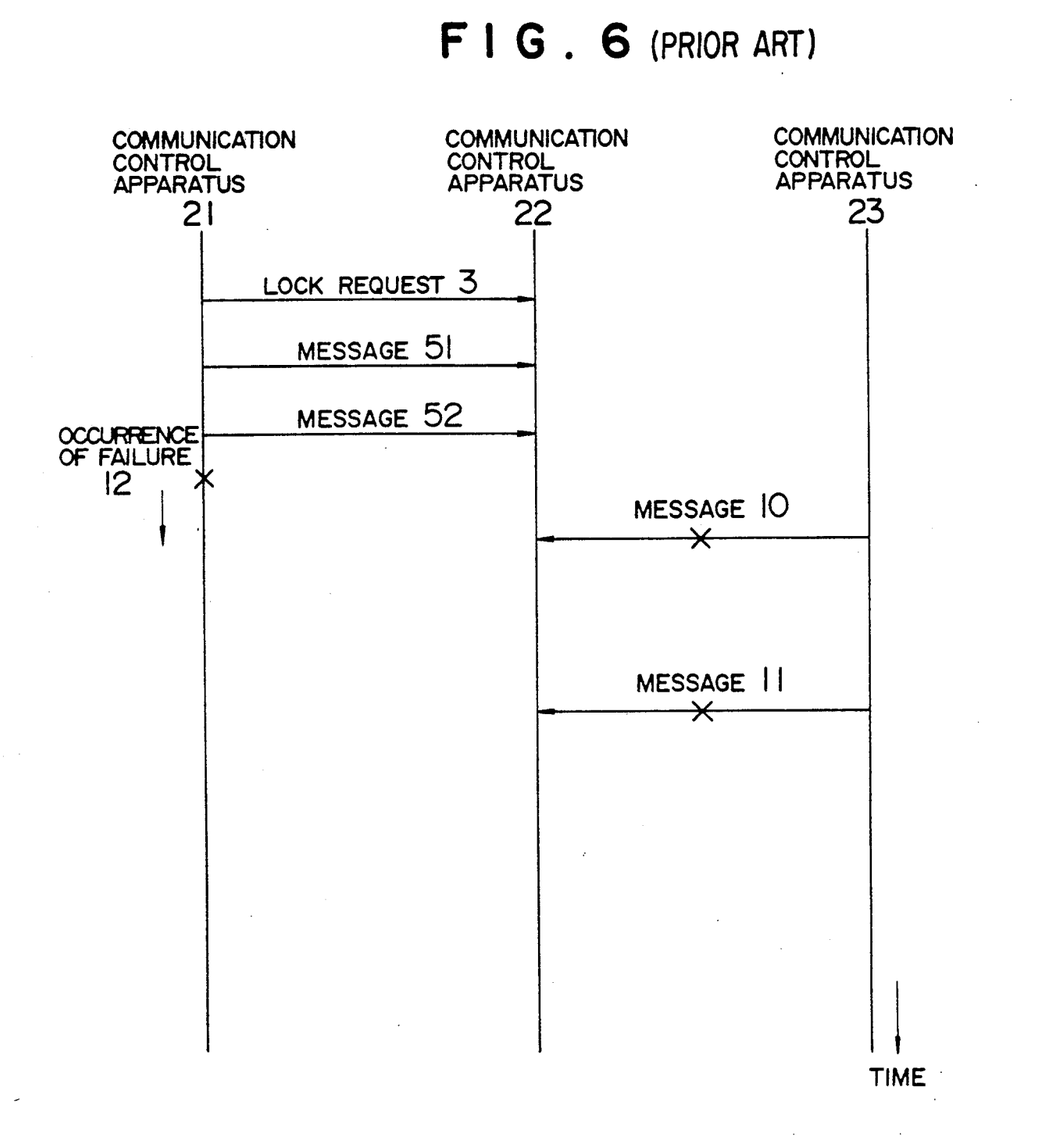

However, in a conventional communication system described above, there may arise such a problem that the communication control apparatus 22 set to a locked state in response to the reception of the lock request packet 3 from the communication control apparatus 21 is permanently left in the locked state, if the addresser communication apparatus 21 becomes incapable of performing any further communication with the addressee communication apparatus 22 because of power-off or some other failure occurring in the addresser communication apparatus 21 during the transmission of messages 51 and 52 therefrom, as illustrated in FIG. 6. In other words, the communication control apparatus 22 is rendered to be permanently in the state incapable of receiving communication packets after the occurrence of a failure in the addresser communication control apparatus 21. Thus, neither a messages 10 nor a message 11 can be received by the address communication control apparatus 22.

SUMMARY OF THE INVENTION

It is therefore an object of the present invention to provide a communication control method for a communication system in which an addresser communication control apparatus is adapted to perform communication with an addressee communication control apparatus by locking the latter through a lock control operation, the method being capable of preventing the addressee communication control apparatus from being left permanently in the locked state due to occurrence of power-off or any failure of the power supply or others in the addresser communication control apparatus by which the addressee communication control apparatus is set to the locked state.

For achieving the above object, according to the present invention, communication is performed by the method described below.

When the addressee communication control apparatus set to the locked state by the addresser communication control apparatus receives no communication packets over a predetermined time period, the addressee communication control apparatus sends out a lock confirmation request packet to the addresser communication control apparatus. Upon reception of the lock confirmation request packet, the addresser communication control apparatus then sends back to the addressee communication control apparatus a lock request packet when the former continues to lock the latter or alternatively an unlock confirmation packet in a case where the addressee communication apparatus is to be released from the occupied or locked state at that time point. In other words, the addressee communication control apparatus set to the locked state sends the lock confirmation request to the addresser communication control apparatus which has locked the addressee communication control apparatus. Then, when the unlock confirmation packet is sent back or when no response is received, the addressee communication control apparatus releases itself from the locked state, thereby preventing the addressee communication control apparatus from being left permanently in the locked state.

DESCRIPTION OF THE PREFERRED EMBODIMENTS

Now, the present invention will be described in more detail in conjunction with a preferred or exemplary embodiment thereof.

Figure 3:
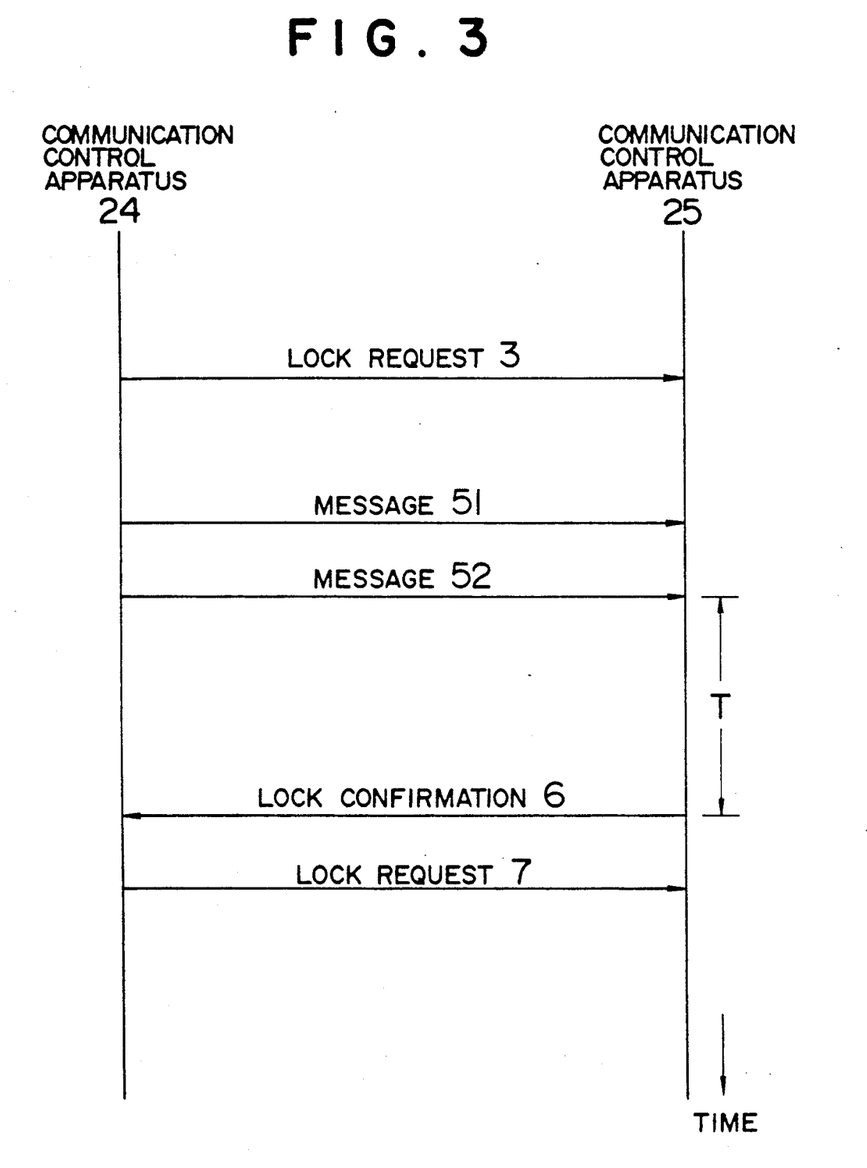
Figure 4:
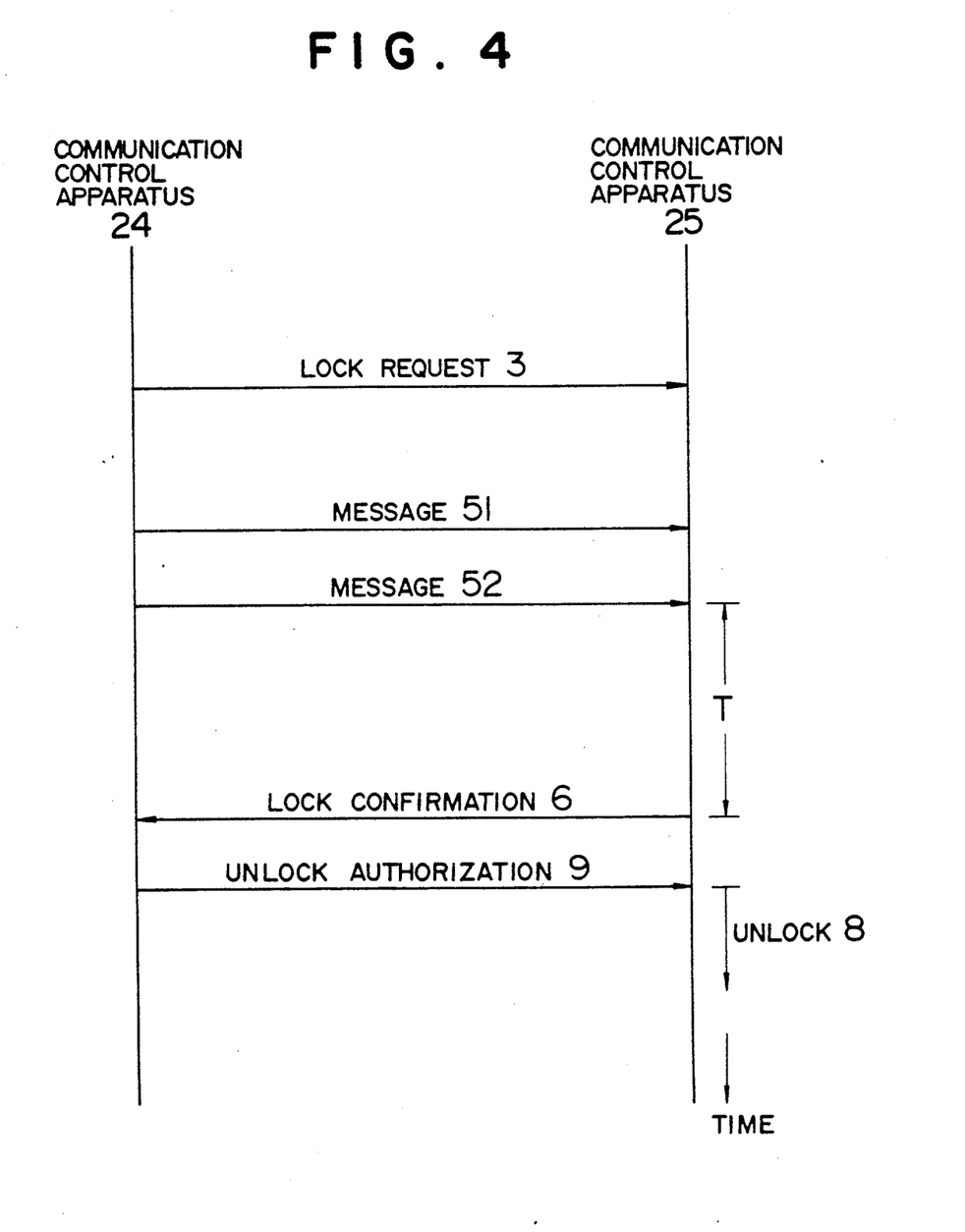
Figure 7:
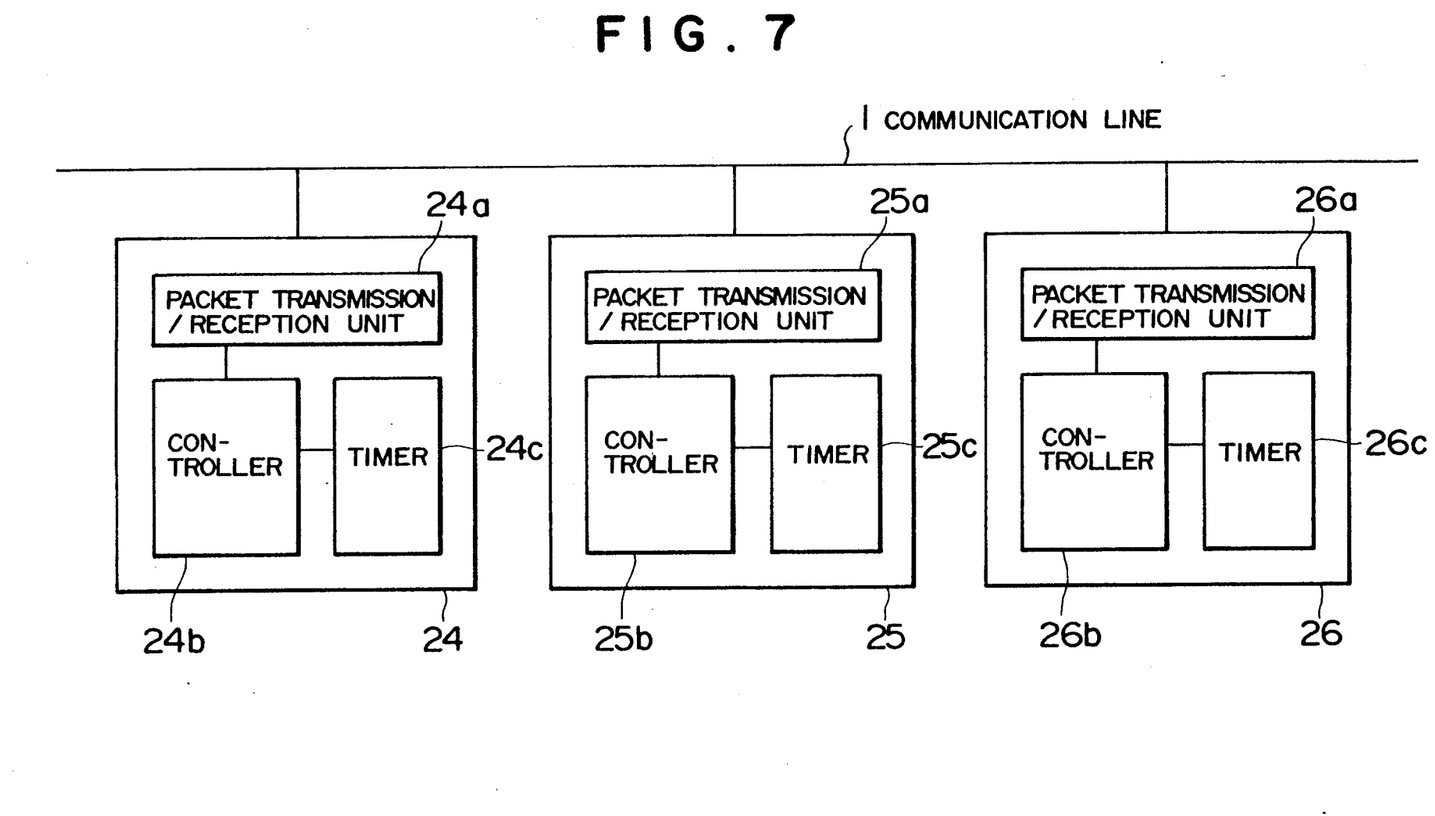
FIG. 7 is a block diagram showing a general arrangement of a communication system to which the communication control method of an embodiment of the present invention can be applied.

FIG. 7 is a block diagram showing a general arrangement of a communication system to which the communication control method of an embodiment of the present invention can be applied. Referring to the figure, a communication control apparatus 24 is generally constituted by a packet transmission reception unit 24a, a controller 24b and a timer unit 24c. Similarly, communication control apparatuses 25 and 26 are composed of packet transmission/reception units 25a and 26a, controllers 25b and 26b, and timer units 25c and 26c, respectively. The packet transmission/reception units 24a, 25a and 26a control the transmission and reception of communication packets transmitted by way of a communication line 1. The timer units 24c, 25c and 26c are controlled by the associated controllers 24b, 25b and 26b, respectively, to thereby perform time management. The controllers 24a, 25a and 26a execute communication control processing and timer control, respectively. In the communication system shown in FIG. 7, it is assumed that the communication control apparatus 24 transmits a communication message to the communication control apparatus 25 through a lock control procedure. In this case, a communication method illustrated in FIG. 3 is carried out. More specifically, in precedence to the transmission of a communication message, the communication control apparatus 24 (also referred to as the addresser communication control apparatus 24 or simply as the addresser 24) first sends out a lock request packet 3 to the communication control apparatus 25 (also referred to as the addressee communication control apparatus 25 or simply as the addressee 25). Upon reception of the lock request packet 3, the addressee communication control apparatus 25 enters a locked state. In this locked state, the communication control apparatus 25 receives a communication packet only from the communication control apparatus 24 but is incapable of receiving any communication packets from the other communication control apparatuses. When the communication control apparatus 24 has recognized that the communication control apparatus 25 is locked, the former sends out the data to be transmitted to the latter in the form of communication message packets 51 and 52. The addressee communication control apparatus 25 monitors an interval in which the incoming message packets are received. When this interval becomes longer than a predetermined time period T, then the addressee communication control apparatus 25 sends a lock confirmation packet 6 to the addresser 24, which has locked the addressee (i.e. the communication control apparatus 24 in this illustrated case), to confirm whether the locked state is to be maintained or not. Upon reception of the lock confirmation packet 6, the addresser communication control apparatus 24 sends back a lock request packet 7 to the addressee communication control apparatus 25 when the latter is to be maintained in the locked state. In response to the reception of the lock request packet 7, the addressee communication control apparatus 25 decides that the addresser control communication apparatus 24 desires to maintain the locked state, and the latter continues to stay in the locked state.

Figure 1:
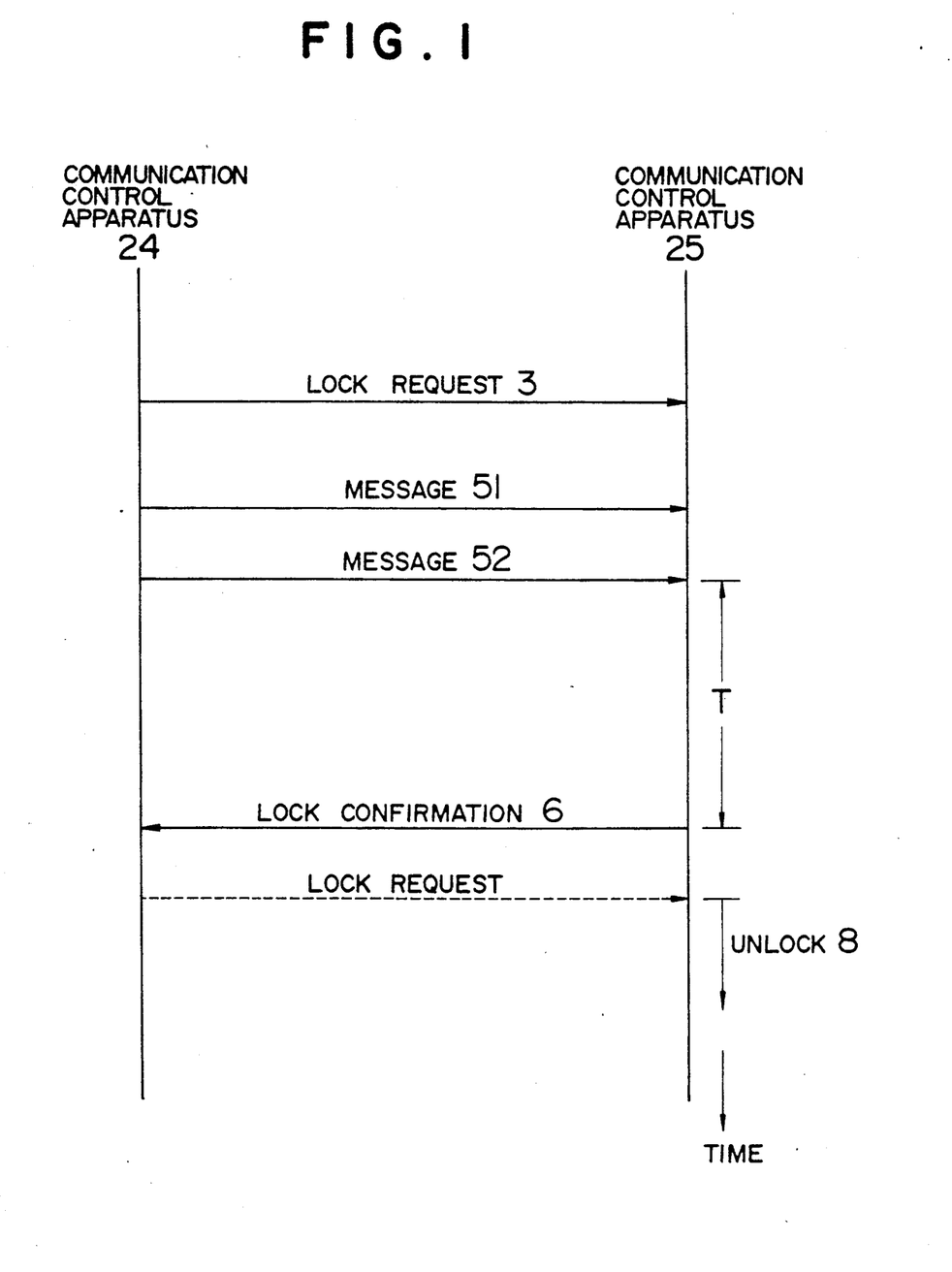
FIGS. 1, 3 and 4 are diagrams illustrating communication sequences in a communication system of an embodiment of the present invention.

Now, it is assumed that the addresser communication control apparatus 24 becomes incapable of performing a communication operation, after it has sent the communication message packets 51 and 52, due to occurrence of power-off or any other failure in the power supply or the like due to some reason, as described hereinbefore in conjunction with FIG. 1. In such a case, the addressee communication control apparatus 25 sends the lock conformation packet 6 to the addresser communication control apparatus 24 after the lapse of the time period T. However, the addresser communication control apparatus 24 is not in a state capable of receiving the lock confirmation packet 6 at this time, so that a lock request packet 7 can not be sent back to the addressee communication control apparatus 25. Upon recognition of reception of no lock request packet 7, the communication control apparatus 25 decides that some failure has taken place in the addresser control communication apparatus 24, and the addressee control communication apparatus 25 releases itself from the locked state. On the other hand, when the addresser communication control apparatus 24 decides, upon reception of the lock confirmation packet 6 from the addressee 25, that the addressee 25 is allowed to be unlocked, the addresser 24 sends back an unlock authorization packet 9 to the addressee communication control apparatus 25. Upon reception of the unlock authorization packet 9, the addressee communication control apparatus 25 decides that it is allowed to release itself from the locked state, and then it enters the unlocked or unocupied state 8.

As will be appreciated from the foregoing, according to the present invention, when the addressee communication control apparatus set to a locked state receives no communication message over a predetermined period of time from the addresser communication control apparatus which has locked the addressee apparatus, the addressee apparatus performs a lock confirmation operation as to whether the addresser apparatus desires to continue the locked state of the addressee apparatus. In a case where no response is received from the addresser in response to the lock confirmation, the addressee communication control apparatus releases itself from the locked state. In this way, an undesirable situation wherein the addressee communication control apparatus is caused to be left permanently in the locked state can be effectively prevented. Thus, the present invention can provide a communication control method which is very advantageous in practical applications.

We claim:

1. A communication control method for use in a communication system comprising an information transmission path for transmitting information including control information and a plurality of communication control apparatuses each including a packet transmission/reception part for allowing the associated communication control apparatuses to perform communication with each other by way of said information transmission path, a timer part for performing time management, and a controller part for managing said packet transmission/reception part and said timer part, said method comprising:

employing a first communication control apparatus acting as a transmitter to bring a second communication control apparatus acting as a receiver into a locked state thereof by sending a communication packet for requesting the second communication control apparatus to be occupied, and to perform communication with the second communication control apparatus while the second control apparatus is in the locked state, employing said second communication control apparatus to make confirmation by transmitting a locked information packet to said first communication control apparatus to perform lock confirmation as to whether said second communication control apparatus is to be maintained in the locked state, when said second communication control apparatus receives no communication packet from said first communication control apparatus over a predetermined period of time, and when no reply is received in response to said lock confirmation packet, operating said second communication control apparatus to release itself from the locked state.

2. A communication control method according to claim 1, wherein, when said first communication control apparatus transmits an unlock authorization packet to said second communication control apparatus in response to said lock confirmation packet, said second communication control apparatus releases itself from the locked state thereof.

3. A communication control method according to claim 1, wherein, when said first communication control apparatus transmits a lock request packet in response to said lock confirmation packet from said second communication control apparatus, said second communication control apparatus is maintained in the locked state thereof as before.

* * * * *